United States Patent
Oh et al.

(10) Patent No.: US 9,603,064 B2
(45) Date of Patent: Mar. 21, 2017

(54) METHOD AND SYSTEM FOR A HIGH-SPEED HANDOVER OF A MOBILE TERMINAL IN A COMMUNICATION SYSTEM

(75) Inventors: Seong-Keun Oh, Gyeonggi-do (KR); Min Lee, Gyeonggi-do (KR)

(73) Assignee: AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 0 days.

(21) Appl. No.: 14/235,294

(22) PCT Filed: Jul. 11, 2012

(86) PCT No.: PCT/KR2012/005493
§ 371 (c)(1),
(2), (4) Date: Jan. 27, 2014

(87) PCT Pub. No.: WO2013/015547
PCT Pub. Date: Jan. 31, 2013

(65) Prior Publication Data
US 2014/0169336 A1 Jun. 19, 2014

(30) Foreign Application Priority Data

Jul. 26, 2011 (KR) .................. 10-2011-0074127

(51) Int. Cl.
*H04W 36/00* (2009.01)
*H04W 36/36* (2009.01)

(52) U.S. Cl.
CPC ... *H04W 36/0055* (2013.01); *H04W 36/0016* (2013.01); *H04W 36/36* (2013.01)

(58) Field of Classification Search
CPC ......... H04W 36/0016; H04W 36/0055; H04W 36/36
See application file for complete search history.

(56) References Cited

U.S. PATENT DOCUMENTS

| 6,879,830 B1 * | 4/2005 | Vollmer et al. ............... 455/442 |
| 2002/0071480 A1 * | 6/2002 | Marjelund ............. H04W 8/22 375/141 |

(Continued)

FOREIGN PATENT DOCUMENTS

| KR | 1020060128542 | 12/2006 |
| KR | 1020070023963 | 3/2007 |
| KR | 1020100071850 | 6/2010 |

OTHER PUBLICATIONS

PCT/ISA/237 Written Opinion issued on PCT/KR2012/005493 (pp. 4).
PCT/ISA/210 Search Report issued on PCT/KR2012/005493 (pp. 3).

*Primary Examiner* — Ian N Moore
*Assistant Examiner* — Justin T Van Roie
(74) *Attorney, Agent, or Firm* — Stein IP, LLC (57) ABSTRACT

The present invention relates to a handover method, and more particularly, to a high-speed handover method for reducing handover delay. To this end, a handover method for a mobile terminal according to the present invention comprises the steps of: determining a first base station to which handover is to be performed; reserving a channel for performing the handover to the first base station and notifying a second base station, from which a service is currently provided, of information on the reserved channel; and performing the handover to the first base station when state information on channels of the first base station is received from the first base station.

12 Claims, 3 Drawing Sheets

(56) References Cited

U.S. PATENT DOCUMENTS

| | | | |
|---|---|---|---|
| 2006/0281461 A1 | 12/2006 | Kwun et al. | |
| 2007/0054667 A1* | 3/2007 | Lee et al. | 455/434 |
| 2007/0258407 A1* | 11/2007 | Li et al. | 370/331 |
| 2008/0287129 A1* | 11/2008 | Somasundaram et al. | 455/436 |
| 2008/0305799 A1 | 12/2008 | Zuniga et al. | |
| 2009/0042576 A1* | 2/2009 | Mukherjee | H04J 11/0093 455/436 |
| 2010/0069071 A1* | 3/2010 | Simonsson et al. | 455/436 |
| 2010/0075677 A1* | 3/2010 | Wang et al. | 455/436 |
| 2010/0285809 A1* | 11/2010 | Lindstrom et al. | 455/450 |
| 2013/0182563 A1* | 7/2013 | Johansson et al. | 370/228 |
| 2013/0343345 A1* | 12/2013 | Dinan | 370/332 |

\* cited by examiner

FIG. 1

Prior Art

METHOD AND SYSTEM FOR A HIGH-SPEED HANDOVER OF A MOBILE TERMINAL IN A COMMUNICATION SYSTEM

PRIORITY

This application is a National Stage application under 35 U.S.C. §371 of an International application No. PCT/KR2012/005493 filed Jul. 11, 2012, and claims priority under 35 U.S.C. §365(b) to Korean Patent Application No. 10-2011-0074127 filed Jul. 26, 2011, the disclosure of each of which is incorporated herein by reference.

TECHNICAL FIELD

The present invention generally relates to a handover method, and more particularly, to a fast handover method of a mobile terminal in a communication system for reducing handover delay and a system thereof.

BACKGROUND ART

Generally, handover denotes a function which switches a conversation channel of a base station which currently provides a service, i.e., a source base station (or source node) to a conversation channel of a neighbor base station of another radio region, i.e., a target base station (or target node) when a mobile terminal moves from a radio region of a base station where the mobile terminal receives the service to a radio region of the neighbor base station. Here, a base station is the generic term for various communication nodes such as a base station, a repeater, a relay, a femto cell base station, an access point, and the like.

Such handover may be classified into hard handover, soft handover, semisoft handover, fast handover, and the like according to a type, an object, and a use of a service to a mobile terminal and a system.

A fast handover targets a reduction of handover delay due to a movement of a mobile terminal and a provision of a fast switching among base stations for a real time traffic such as a voice, a video, and the like. In a fast handover, one base station (or access point) which provides a service is switched to other base station during a preset time, and handover processing time varies according to a related service and generally is about hundreds of milliseconds.

In a fast handover, a mobile terminal performs a Random Access Procedure (RAP) in order to access a target base station. This random access procedure is classified into a contention-based random access procedure and a contention-free random access procedure. The contention-based random access procedure denotes a procedure in which a plurality of mobile terminals select one of random access channels and competitively perform an access to a target base station, and the contention-free random access procedure denotes a procedure in which an arbitrary mobile terminal performs an access to a target base station using a previously allocated random access channel without a collision with other mobile terminals. Hereinafter, a handover procedure using a conventional contention-free random access procedure will be described with referent to FIG. 1.

Figure 1:
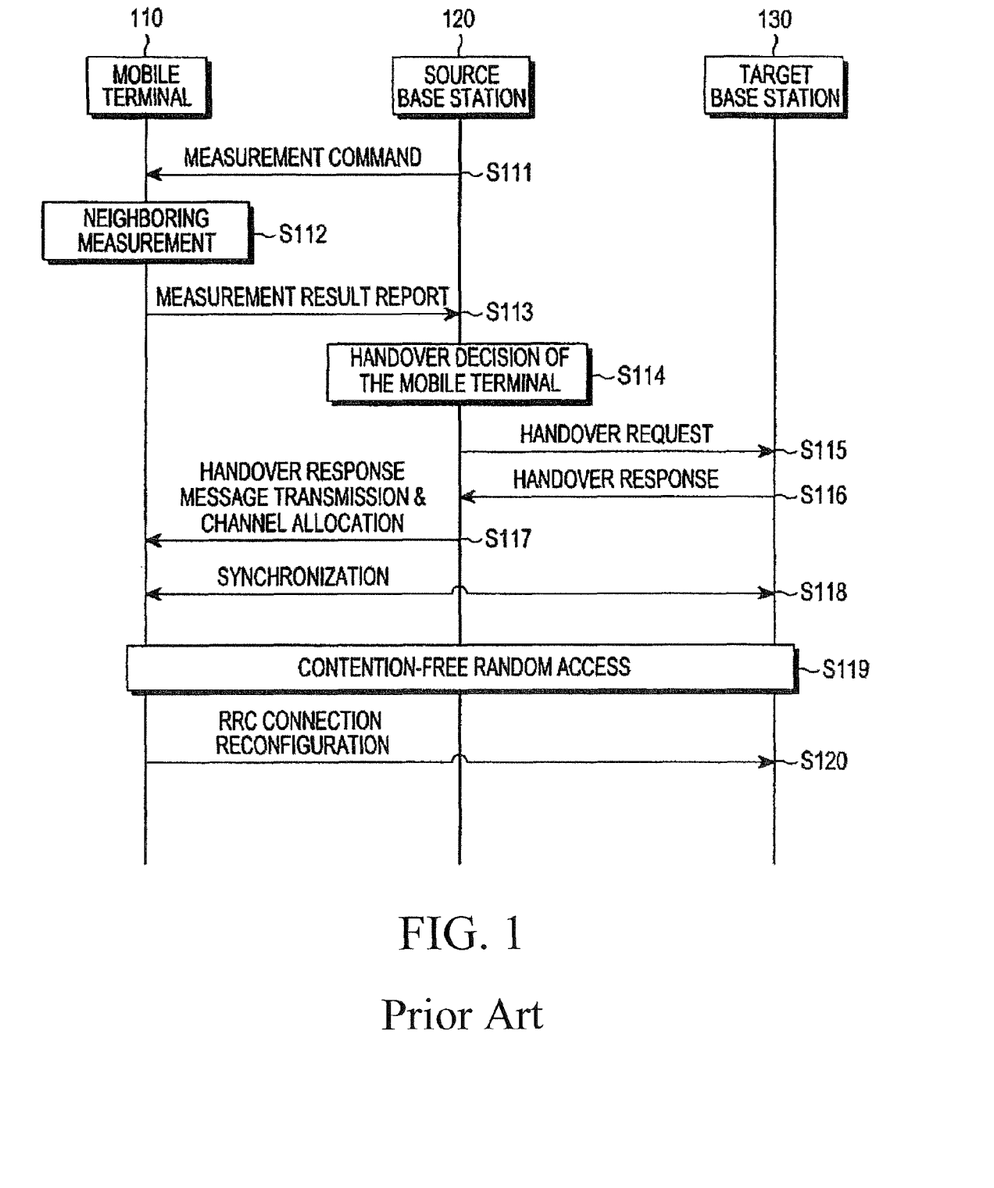
FIG. 1 illustrates a conventional network-centric handover procedure using contention-free random access.

FIG. 1 illustrates a conventional network-centric handover procedure using contention-free random access.

As illustrated in FIG. 1, the conventional network-centric handover procedure using contention-free random access will be followed.

Source base station 120 is a base station which provides a service to a mobile terminal 110, and transmits information of base stations which are located nearby the source base station 120 to the mobile terminal 110 which intends to perform handover. The information includes at least one base station unique information, cell ID, prefix information, and the like. The source base station 120 transmits a command to measure at least one of strength, an Signal to Noise Ratio (SNR), and an Signal to Interference plus Noise (SINR) of a signal received from base stations included in the information to the mobile terminal 110 (S111).

After receiving the measurement command from the source base station 120, the mobile terminal 110 measures at least one of strength, an SNR, and an SINR of a signal through a signal received from at least one base station which is nearby located (S112). The mobile terminal 110 transmits a measured result to the source base station 120 (S113). The source base station 120 decides whether or not to handover for the mobile terminal 110 and a target base station using the measured result received from the mobile terminal 110 (S114). The source base station 120 transmits a handover request message to a target base station 130 (S115). The handover request message is a message which the mobile terminal 110 transmits to a base station where the mobile terminal 110 intends to handover, i.e., the target base station 130. The handover request message includes information which a mobile terminal requires in order to perform a handover such as information on the mobile terminal, information of the source base station 120, and the like. After receiving a handover response message from the target base station 130 (S116), the source base station 120 transmits the received handover response message to the mobile terminal 110 (S117). The handover response message includes information on a channel for the mobile terminal 110 to access the target base station 130. The channel is contention-free random access channel.

The mobile terminal 110 performs a synchronization procedure with the target base station 130 where the mobile terminal 110 intends to handover (S118), and performs a contention-free random access procedure. The mobile terminal 110 reconfigures connection to a target base station through a Radio Resource Control (RRC) message (S120).

DISCLOSURE

Technical Problem

In a network-centric handover procedure, if a mobile terminal performs handover to a target base station through contention-based random access, a channel collision occurs when other mobile terminals transmit a random access signal by selecting same channels. If the channel collision occurs, mobile terminals which request a relevant channel retry to perform random access using an arbitrary channel after back-off time. In this case, handover delay occurs due to the random access retry, so a problem that a smooth service is not provided to a user of a mobile terminal arises due to the handover delay.

In a network-centric handover procedure, if a mobile terminal performs handover to a target base station through contention-free random access, the mobile terminal which is allocated a designated channel from the target base station may perform random access to the target base station without collision, so the mobile terminal may perform a fast random access. However, there is a limit for reducing handover delay due to other delay which occurs since the mobile terminal 110 waits until a previously designated channel is allocated from the target base station 130 via the source base station 120.

Technical Solution

To this end, a handover method of a mobile terminal according to the present invention comprises requesting, by the mobile terminal, handover acceptance to at least one target node using resource of the at least one target node.

To this end, a mobile communication system providing handover of a mobile terminal according to the present invention comprises a mobile terminal configured to request handover acceptance to at least one target node using resource of the at least one target node.

Advantageous Effects

As is apparent from the foregoing description, the present invention enables a mobile terminal to previously provide handover registration information including security mode information to at least one target base station via at least one source base station, and enables the mobile terminal to perform contention-free random access to a target base station thereby reducing handover delay time.

The present invention enables a mobile terminal to previously provide handover registration information including security mode information to at least one target base station via at least one source base station thereby omitting a security set up procedure and reducing handover delay time.

The present invention enables a mobile terminal to perform fast random access to a target base station using a plurality of random access channels thereby reducing access time which is necessary for handover to a target base station.

BEST MODE

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

Figure 2:
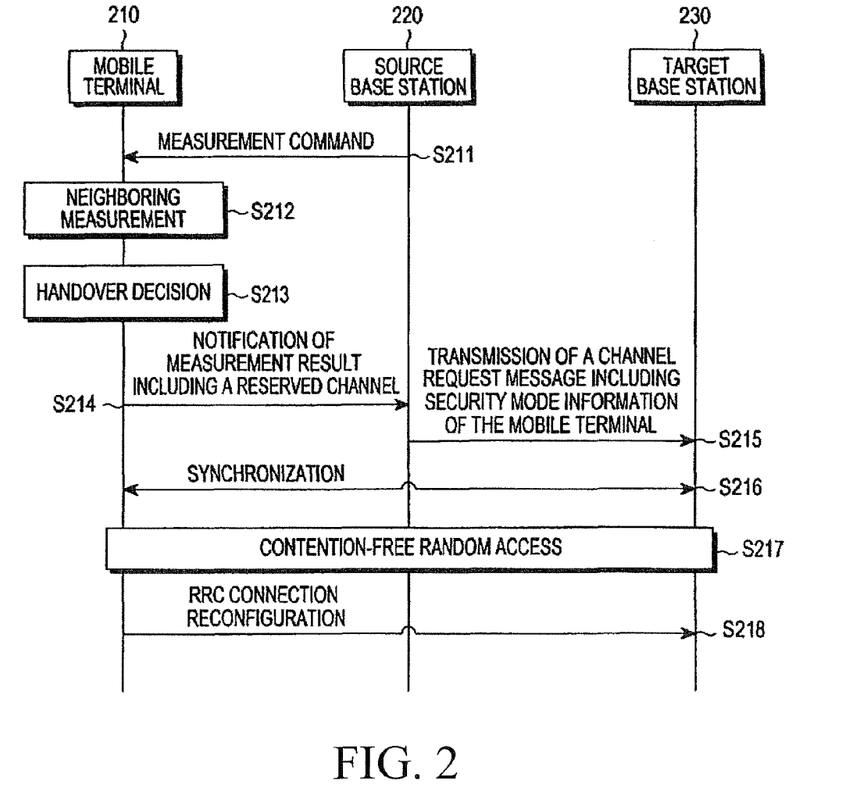
FIG. 2 illustrates a handover procedure using handover notification and reserved access according to an embodiment of the present invention.

FIG. 2 illustrates a handover procedure using handover notification and reserved access according to an embodiment of the present invention.

As illustrated in FIG. 2, at least one source base station 220 transmits to the mobile terminal 210 information of at least one base station which is located nearby the source base station 220 to a mobile terminal 210 which intends to perform handover in a service area of the least one source base station 220. The source base station 220 is a base station which provides a service such as data transmission/reception to the mobile terminal 210. The information includes base station unique information, a cell ID, prefix information, and information indicating a channel state of each base station. The channel may be a random access channel or a traffic channel. Further, the source base station 220 transmits a command to measure at least one of strength, an SNR, and an SINR of a signal received from at least one base station included in the information to the mobile terminal 210 (S211).

Thereafter, the mobile terminal 210 measures at least one of strength, an SNR, and an SINR of a signal through the signal received from at least one base station which is nearby located upon receiving the measurement command from the source base station 220 (S212). The mobile terminal 210 determines whether or not to perform handover and at least one base station where the mobile terminal 210 intends to handover, i.e., a target base station using the measured result (S213). The determined at least one target base station may be determined using mobility and direction of the mobile terminal 210. The mobile terminal 210 selects a channel for random access the determined at least one base station, i.e., the target base station and reserves the selected channel. Likewise, the channel which is reserved for random access the target base station is a contention-free random access channel. The mobile terminal 210 may reserve a plurality of channels. Information on a random access channel of a target base station 230 may be obtained via the source base station 220 or a system information message of a target base station.

The mobile terminal 210 transmits a measured result, target base station information, and information on a reserved channel to the source base station 220 in order to provide a handover registration information message including the information on the reserved channel (S214). The target base station information includes base station unique information, a cell ID, and prefix information. The mobile terminal 210 may release connection to the source base station 220 and try to access a target base station after transmitting information on a channel which the mobile terminal 210 reserves to the source base station 220. On the other hand, the mobile terminal 210 may try to access a target base station 230 whose connection to the source base station 220 is maintained. After receiving the information on the reserved channel, the source base station 220 transmits a channel request message including the information on the reserved channel and security mode information of a mobile terminal to the target base station 230 (S215). That is, the source base station 220 includes the security mode information of the mobile terminal 210 into a message which is transmitted to the target base station 230 which requests a channel reservation of the mobile terminal 210, and transmits the message. The mobile terminal 210 may omit a message exchange procedure for security setting upon initial connecting to a target base station through the security mode information thereby facilitating a fast handover. In this way, a mobile terminal provides handover registration information to at least one target base station via at least one source base station. On the other hand, a mobile terminal may provide handover registration information to at least one target base station using resource of the at least one target base station.

The handover registration information includes at least one of security mode information set between the mobile terminal 210 and the source base station 220, an ID of the mobile terminal, a unique identification number of the mobile terminal, random access channel reservation information of the target base station 230, channel quality information between the mobile terminal and the target base station 230. The security mode information is authentication information necessary for performing handover from a mobile terminal to a target base station, and transmitting/receiving data to/from the target base station.

In step S215, after receiving the channel reservation request message from the mobile terminals, the target base station 230 provides channel state information of the target base station 230 to at least one mobile terminal through system information of the target base station 230. The channel state information denotes state information of a random access channel. After receiving the channel request message including the security mode information of the mobile terminal 210 from the source base station 220, the target base station 230 allocates a channel which the mobile terminal 210 reserves to the mobile terminal 210 by marking the channel reserved by the mobile terminal 210 among available channels. The target base station 230 provides channel state information indicating reservation or allocation of these channels to a mobile terminal through system information. If the reserved channel is requested to reserve by at least one other mobile terminal, i.e., if a collision occurs since the channel which the mobile terminal 210 requests to reserve is identical to a channel which other mobile terminals request to reserve, the target base station 230 classifies the channel which is requested to reserve as a unreserved channel, and controls corresponding mobile terminals to perform contention-based random access. Likewise, the target base station 230 does not mark a relevant channel since a plurality of mobile terminals reserve one channel and collision occurs due to this. A marking indicates that a relevant channel is reserved or allocated, and a no-marking indicates that the relevant channel is not reserved or allocated. In this manner, a target base station classifies the previously reserved resource as a unreserved resource if the target base station cannot allocate the previously reserved resource to the mobile terminal.

After providing the measured result and the information on the reserved channel, the mobile terminal 210 performs a synchronization procedure with the target base station 230 (S216). The synchronization procedure denotes a procedure of synchronizing a frame sequence and time between the mobile terminal 210 and the target base station 230.

The mobile terminal 210 performs a contention-free random access procedure by transmitting a random access signal using a channel which the mobile terminal 210 and the target base station 230 reserve (S217). The mobile terminal 210 may perform a contention-based random access procedure in step S217 if a reserved channel is not marked. In this manner, a mobile terminal performs random access to at least one target base station using resource of the at least one target base station. Here, the mobile terminal may perform contention-free random access by previously reserving resource of the at least one target base station, or may perform contention-based random access using the resource of the at least one target base station. The mobile terminal transmits at least one random access signal using at least one resource of the at least one target base station. If the mobile terminal transmits the at least one random access signal using at least two of the at least one resource, the mobile terminal may transmit the same random access signal or different random access signals using the at least two resources.

The mobile terminal 210 performs a random access procedure by transmitting a random access signal using a random access channel of the target base station 230 which the mobile terminal 210 and the target base station 230 reserve in S217. The random access procedure denotes a contention-free access between the mobile terminal 210 and other mobile terminal when the mobile terminal 210 performs handover to the target base station 230. The mobile terminal 210 may detect the number of total channels allocated to the target base station 230, allocated or reserved channels, and unreserved or unreserved channels through state information of channels included in the system information received from the target base station 230. Upon detecting that a channel which the mobile terminal 210 reserves is normally allocated, the mobile terminal 210 performs handover by performing a contention-free access to the target base station 230. If the channel which the mobile terminal 210 reserves is not allocated in the received state information of channels, the mobile terminal 210 performs handover by transmitting a random access signal using at least one of unreserved channels and performing contention-based random access the target base station 230.

After directly receiving system information from the target base station, a mobile terminal may succeed in random access without collision or contention (i.e., contention-free) by a random access signal using a relevant channel upon performing a random access procedure to a target base station if a channel which the mobile terminal requests is marked, i.e., if the mobile terminal performs handover to the target base station 230 using the channel which the terminal requests. If the channel which the mobile terminal requests is not allocated, the mobile terminal performs a contention-based random access procedure with other mobile terminals by selecting at least one among unreserved channels. In this contention-based random access procedure, a random access procedure is also performed by transmitting a random access signal using a unreserved channel. In this way, if a channel which the mobile terminal previously reserves is not allocated to the mobile terminal, the mobile terminal performs contention-based random access using unreserved resources of the at least one target base station.

Thereafter, the mobile terminal 210 reconfigures connection to the target base station 230 by transmitting a Radio Resource Control (RRC) message using resource of the target base station 230 (S218). The radio resource control message may include a message which requests handover acceptance to the target base station 230.

The target base station 230 decides whether to accept the handover of the mobile terminal 210 through handover acceptance request message, and transmits the decision to the mobile terminal 210. In this way, a mobile terminal requests a handover acceptance to at least one target base station using resource of the at least one target base station. Here, handover acceptance request information requesting handover acceptance includes at least one of security mode information set between the mobile terminal and an associated source base station, an ID of the mobile terminal, a unique identification number of the mobile terminal, and channel quality information between the mobile terminal and a relevant target base station. In this way, after receiving the request for handover acceptance from the mobile terminal, the target base station decides whether to accept the handover of the mobile terminal, and provides the decision to the mobile terminal using the resource of the at least one target base station.

In the described embodiment, a mobile terminal provides handover registration information prior to handover accept request information which requests handover acceptance, however, it will be noted that this is just one embodiment. A mobile terminal may simultaneously provide a part or all of handover registration information and handover acceptance request information to the at least one target base station, or the mobile terminal may sequentially provide a part or all of handover registration information and handover acceptance request information to the at least one target base station. If the mobile terminal sequentially provides the part or all of handover registration information and handover acceptance request information, the mobile terminal may provide the part or all of handover registration information before or after handover acceptance request information.

In the described embodiment, a mobile terminal releases connection to a source base station and requests handover acceptance to a target base station using a target base station resource, however, it will be noted that this is just one embodiment. A mobile terminal may maintain connection to at least one of at least one source base station and request handover acceptance to at least one target base station, or may release connection to the at least one of the at least one source base station and request handover acceptance to the at least one target base station. If the mobile terminal releases connection to the at least one of the at least one source base station, the mobile terminal may provide handover registration information via the at least one source base station whose connection is released, or the mobile terminal may provide handover registration information via the at least one source base station whose connection is maintained before releasing connection to the at least one source base station whose connection is released. Regardless of whether to maintain connection or whether to release connection, the mobile terminal may directly provide handover registration information to the target base station using the target base station resource.

Figure 3:
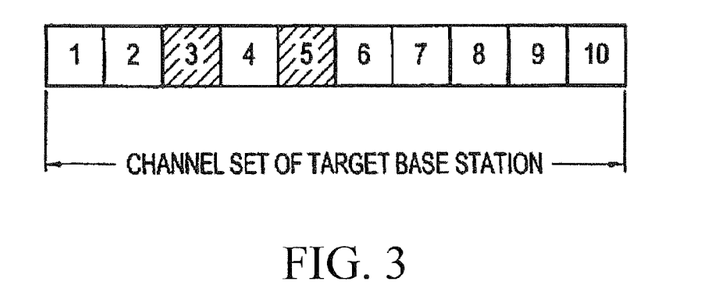
FIG. 3 illustrates an example of RAP which a target base station provides through system information according to an embodiment of the present invention.

FIG. 3 illustrates an example of channel state information which a target base station provides through system information according to an embodiment of the present invention.

As illustrated in FIG. 3, it will be understood that a channel 3 and a channel 5 in a channel set including ten channels for a target base station are marked and provided to mobile terminals through a system information message. Each channel is a random access channel. If a first mobile terminal, a second mobile terminal, and a third mobile terminal which determine to perform handover select and request a channel 3, a channel 6, and channels 5 and 6, respectively, to the target base station, the first mobile terminal which requests the channel 3 as a reserved channel may contention-free access the target base station using the channel 3 upon performing a random access procedure since the channel 3 is marked in the system information. The second mobile terminal which requests the channel 6 should perform a contention-based access by randomly selecting at least one of eight unmarked channels upon performing a random access procedure since the channel 6 is not marked in the system information due to a collision. However, the third terminal requests two channels, i.e., the channel 5 and the channel 6, a collision does not occur in the channel 5 while a collision occurs in the channel 6, so the channel 5 is marked in the system information. So, the third terminal may contention-free access the target base station using the channel 5 upon performing a random access procedure.

Figure 4:
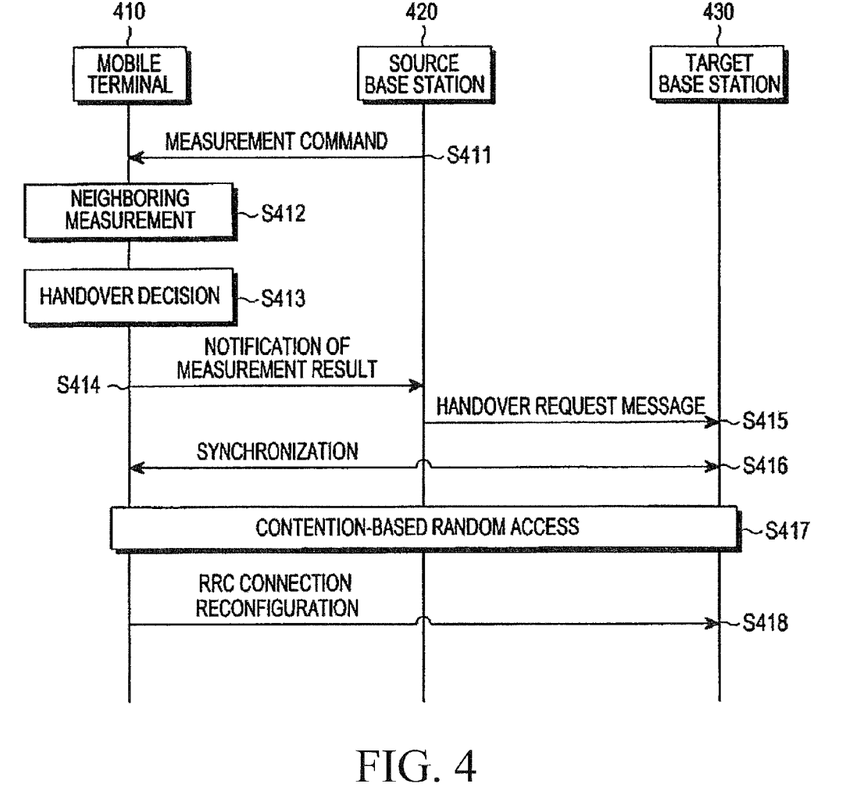
FIG. 4 illustrates a handover procedure using handover notification and multi channel transmission fast random access according to an embodiment of the present invention.

FIG. 4 illustrates a handover procedure using handover notification and multi channel transmission fast random access according to an embodiment of the present invention.

As illustrated in FIG. 4, a mobile terminal 410 receives information on at least one base station which is nearby located from at least one source base station 420. The terminal 410 receives system information from each of the at least one base station which is nearby located. The information, or the system information includes unique information, a cell ID, prefix information, and channel state information of each base station. The channel may be a random access channel, or a traffic channel. The source base station 420 transmits a command to measure at least one of strength, an SNR, and an SINR of a signal received from the at least one base station included in the information to the mobile terminal 410 (S411).

Thereafter, the mobile terminal 410 measures at least one of strength, an SNR, and an SINR of a signal through the signal received from at least one base station which is nearby located upon receiving the measurement command from the source base station 420 (S412). The mobile terminal 410 determines whether to perform handover and at least one base station where the mobile terminal 410 intends to handover, i.e., a target base station using the measured result (S413). The determined at least one target base station may be determined using mobility and direction of the mobile terminal 410.

The mobile terminal 410 provides the measured result including information of the mobile terminal 410 to the source base station 420 (S414). After transmitting the measured result to the source base station 420, the mobile terminal 410 may release connection to the source base station 420. On the other hand, the mobile terminal 410 may intend to access the target base station 430 in a state where the mobile terminal 410 maintains connection to the source base station 420. In step S414, after receiving the measured result from the mobile terminal 410, the source base station 420 transmits a handover registration information message to the target base station 430 (S415). The handover registration information message includes information of the mobile terminal 410, and information of the source base station 420. The handover registration information message includes security mode information of a mobile terminal. Like this, it is possible that the mobile terminal 410 omits a message exchange procedure for setting a security in initial connection to the target base station 230 and fast handovers by transmitting a handover registration information message including security mode information. In this way, a mobile terminal provides handover registration information to at least one target base station via at least one source base station. On the other hand, a mobile terminal may provide directly handover registration information to at least one target base station using resource of the at least one target base station.

Handover registration information includes at least one of security mode information set between the mobile terminal 410 and the source base station 420, an ID of the mobile terminal, a unique identification number of the mobile terminal, random access channel reservation information of the target base station 430, channel quality information between the mobile terminal and the target base station 430. The security mode information is authentication information necessary for performing handover from the mobile terminal 410 to a target base station, and transmitting/receiving data to/from the target base station 430.

After step S415, the mobile terminal 410 performs a synchronization procedure with the target base station 430 (S416). The synchronization procedure denotes that a procedure where a frame sequence and time are synchronized between the mobile terminal 410 and the target base station 430.

After step S416, the mobile terminal 410 detects unreserved channels among random access channels of the target base station 430. The mobile terminal 410 may detect the unreserved random access channels through system information received from the target base station 430. The mobile terminal 410 performs a contention-based random access procedure with the target base station 430 (S417). In step S417, if the mobile terminal 410 intends to perform contention-based random access the target base station 430, the target base station 430 notifies the mobile terminal 410 of whether to collide. The mobile terminal 410 performs a contention-based random access procedure with the target base station 430 where the mobile terminal 410 intends to handover using at least one of unreserved channels of a target base station. That is, a contention-based random access procedure which a mobile terminal and a target base station perform may be performed by transmitting different random access signals or the same random access signal to the target base station 430 using at least one of unreserved random access channels of the target base station 430. That is, in a random access procedure, at least one random access signal is transmitted to the target base station 430 for proceeding a handover. The reason for transmitting at least one random access signal is for increasing an access success probability. In this way, a mobile terminal performs random access to the at least one target base station using resource of the at least one target base station. The mobile terminal may perform contention-based random access using resource of the at least one target base station. Further, upon performing random access by transmitting at least one random access signal using resource of the at least one target base station, the mobile terminal may transmit the same random access signal or different random access signals using at least two resources if the mobile terminal transmits at least one random access signal using the at least two resources of the at least one resource.

As described above, a mobile terminal may increase an access success probability since the mobile terminal performs contention-based random access through at least one random access signal. That is, a procedure where a mobile terminal performs fast random access by transmitting at least one random access signal according to the present invention provides an opportunity to the mobile terminal which intends to perform handover in order that an initial random access try maximally succeeds. For example, if a mobile terminal which intends to perform handover transmits a random access signal using two channels in order to perform a random access procedure, a random access signal using other channel does not collide with other mobile terminal even though one random access signal collide with a random access signal of the other mobile terminal due to a usage of the same random access channel, so the mobile terminal 410 may successfully perform random access. In the described example, a mobile terminal performs a random access procedure through two random access signals, however, it will be understood by those of ordinary skill in the art that the mobile terminal may perform a random access procedure using more than two random access signals.

The mobile terminal 410 reconfigures connection to a target base station through a Radio Resource Control (RRC) message using resource of a target base station 430 (S418).

The RRC message includes a message through which the mobile terminal 410 requests a handover acceptance to a target base station 430 as well as unique information of the mobile terminal 410 such as an ID and a unique identification number for establishing a connection. In this way, a mobile terminal requests a handover acceptance to at least one target base station using resource of the at least one target base station. Here, handover acceptance request information requesting handover acceptance includes at least one of security mode information set between a mobile terminal and an associated source base station, an ID of the mobile terminal, a unique identification number of the mobile terminal, and channel quality information between the mobile terminal and a relevant target base station.

Upon receiving the message which requests handover acceptance, the target base station decides whether to accept handover request of a mobile terminal, and notifies the mobile terminal of the decision. In this way, when handover acceptance is requested from the mobile terminal, the target base station decides whether to accept the handover request of the mobile terminal, and provides the decision to the mobile terminal using resource of the at least one target base station.

In the described embodiment, a mobile terminal provides handover registration information prior to handover acceptance request information which requests handover acceptance, however, it will be noted that this is just one embodiment. A mobile terminal may simultaneously provide a part or all of handover registration information and handover acceptance request information to the at least one target base station or the mobile terminal may sequentially provide a part or all of handover registration information and handover acceptance request information to the at least one target base station. If the mobile terminal sequentially provides the part or all of handover registration information and handover acceptance request information, the mobile terminal may provide the part or all of handover registration information before or after handover acceptance request information.

In the described embodiment, a mobile terminal releases connection to a source base station and requests handover acceptance to a target base station using a target base station resource, however, it will be noted that this is just one embodiment. A mobile terminal may maintain connection to at least one of at least one source base station and request handover acceptance to at least one target base station, or may release connection to the at least one of the at least one source base station and request handover acceptance to the at least one target base station. If the mobile terminal releases connection to the at least one of the at least one source base station, the mobile terminal may provide handover registration information via the at least one source base station whose connection is released, or the mobile terminal may provide handover registration information via the at least one source base station whose connection is maintained before releasing connection to the at least one source base station whose connection is released. Regardless of whether to maintain connection or whether to release connection, the mobile terminal may directly provide handover registration information to the target base station using the target base station resource.

In the described embodiment, a mobile terminal performs handover between a source base station and a target base station consisting of the same Radio Access Technology (RAT), however, it will be noted that this is just one embodiment. A RAT of at least one source base station where the mobile terminal performs the handover may be different from a RAT of at least one target base station where the mobile terminal performs the handover. When the mobile terminal hands off at least two source base stations, RATs of a part or all of the at least two source base stations may be different one another, or when the mobile terminal on at least two target base stations of the at least one target base station, RATs of a part or all of the at least two target base stations may be different one another.

In the described embodiment, a mobile terminal performs handover among base stations, however, it will be understood by those of ordinary skill in the art that the mobile terminal may perform handover among communication nodes such as a base station, a repeater, a relay, a femto cell base station. So, in the described embodiment, it will be understood by those of ordinary skill in the art that a base station is generalized as a communication node.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A handover method of a mobile terminal, the method comprising:
   a) determining, by the mobile terminal, at least one target node to which the mobile terminal intends to handover;
   b) selecting, by the mobile terminal, at least one channel of the at least one target node for a reserved access to the at least one target node;
   c) providing, by the mobile terminal, information on the at least one target node and information on the selected at least one channel of the at least one target node for the reserved access to the at least one target node, to at least one source node;
   d) providing, by at least one of the at least one source node, the information on the selected at least one channel for the reserved access to the at least one target node;
   e) requesting, by the mobile terminal, handover acceptance to the at least one target node; and
   f) performing, by the mobile terminal, random access to the at least one target node,
   wherein the mobile terminal performs contention-free random access by previously reserving a resource of the at least one target node, or performs contention-based random access using the resource of the at least one target node,
   wherein, when the at least one target node cannot allocate a previously reserved resource to the mobile terminal, the at least one target node classifies the previously reserved resource as an unreserved resource,
   wherein, when the previously reserved resource is not allocated to the mobile terminal, the mobile terminal performs contention-based random access using the unreserved resource of the at least one target node,
   wherein the mobile terminal transmits at least one random access signal using at least one resource of the at least one target node, and
   wherein, when the mobile terminal transmits the at least one random access signal using at least two resources, the mobile terminal transmits a same random access signal or different random access signals using the at least two resources.

2. The method of claim 1, further comprising:
   providing, by the at least one of the at least one source node, handover registration information to the at least one target node,
   wherein the handover registration information includes at least one of security mode information established between the mobile terminal and the at least one source node, an identifier of the mobile terminal, a unique identification number of the mobile terminal, and channel quality information between the mobile terminal and the at least one target node.

3. The method of claim 1, wherein the mobile terminal maintains connection to the at least one source node and requests the handover acceptance to the at least one target node, or the mobile terminal releases connection to the at least one source node and requests the handover acceptance to the at least one target node.

4. The method of claim 1, wherein, when the handover acceptance is requested from the mobile terminal, the at least one target node decides whether to accept a handover of the mobile terminal or not, and provides the decision as to whether or not to accept the handover of the mobile terminal to the mobile terminal.

5. The method of claim 1, wherein the handover acceptance is requested by transmitting a handover acceptance request message to the at least one target node.

6. The method of claim 1, wherein a Radio Access Technology (RAT) of the at least one target node differs from a RAT of the at least one source node,
   wherein, when the mobile terminal hands off at least two source nodes, RATs of a part or all of the at least two source nodes differ from one another, and
   wherein, when the mobile terminal hands on at least two target nodes, RATs of a part or all of the at least two target nodes differ from one another.

7. A mobile communication system comprising:
   a mobile terminal configured to determine at least one target node to which the mobile terminal intends to handover, configured to select at least one channel of the at least one target node for a reserved access to the at least one target node, configured to provide information on the at least one target node and information on the selected at least one channel of the at least one target node for the reserved access to the at least one target node, to at least one source node, and configured to request handover acceptance to the at least one target node; and
   at least one of the at least one source node configured to provide the information on the selected at least one channel for the reserved access to the at least one target node,
   wherein, when the handover acceptance is requested from the mobile terminal through a Radio Resource Control (RRC) message, the at least one target node decides whether to accept a handover of the mobile terminal or not, and provides the decision as to whether or not to accept the handover of the mobile terminal to the mobile terminal using a resource of the at least one target node,
   wherein a Radio Access Technology (RAT) of the at least one target node differs from a RAT of the at least one source node,
   wherein, when the mobile terminal hands off at least two source nodes, respective RATs of the at least two source nodes differ from one another, and
   wherein, if the mobile terminal hands on to at least two target nodes, respective RATs of the at least two target nodes differ from one another.

8. The mobile communication system of claim 7, wherein the mobile terminal performs random access to the at least one target node using the resource of the at least one target node.

9. The mobile communication system of claim 7, wherein the mobile terminal maintains connection to the at least one source node and requests the handover acceptance to the at least one target node, or the mobile terminal releases connection to the at least one source node and requests the handover acceptance to the at least one target node.

10. The method of claim 1, wherein the information on the at least one target node includes at least one of node unique information, cell identification, prefix information of the at least one target node.

11. The method of claim 1, wherein the information on the at least one target node includes at least one of node unique information, cell identification, prefix information of the at least one target node.

12. A handover method of a mobile terminal, the method comprising:
   a) determining, by the mobile terminal, at least one target node to which the mobile terminal intends to handover;
   b) selecting, by the mobile terminal, at least one channel of the at least one target node for a reserved access to the at least one target node;
   c) providing, by the mobile terminal, information on the at least one target node to at least one source node;
   d) providing, by the mobile terminal, information on the selected at least one channel of the at least one target node for the reserved access to the at least one target node, and security mode information of the mobile terminal to the at least one target node using a resource of the at least one target node;
   e) requesting, by the mobile terminal, handover acceptance to the at least one target node using the resource of the at least one target node; and
   f) performing, by the mobile terminal, random access to the at least one target node,
   wherein the mobile terminal performs contention-free random access by previously reserving a resource of the at least one target node, or performs contention-based random access using the resource of the at least one target node,
   wherein, when the at least one target node cannot allocate a previously reserved resource to the mobile terminal, the at least one target node classifies the previously reserved resource as an unreserved resource,
   wherein, when the previously reserved resource is not allocated to the mobile terminal, the mobile terminal performs contention-based random access using the unreserved resource of the at least one target node,
   wherein the mobile terminal transmits at least one random access signal using at least one resource of the at least one target node, and
   wherein, when the mobile terminal transmits the at least one random access signal using at least two resources, the mobile terminal transmits a same random access signal or different random access signals using the at least two resources.

* * * * *